(12) United States Patent
Jala et al.

(10) Patent No.: US 10,855,070 B2
(45) Date of Patent: Dec. 1, 2020

(54) VEHICLE AND METHOD OF DELIVERING ELECTRICAL CURRENT TO AN OUTLET ON THE VEHICLE

(71) Applicant: FORD GLOBAL TECHNOLOGIES, LLC, Dearborn, MI (US)

(72) Inventors: Sriram Jala, Northville, MI (US); Muhammad Zubair Feroz, Dearborn, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 247 days.

(21) Appl. No.: 16/135,637

(22) Filed: Sep. 19, 2018

(65) Prior Publication Data
US 2020/0086743 A1   Mar. 19, 2020

(51) Int. Cl.
*H02H 5/04* (2006.01)
*B60L 1/00* (2006.01)
*H01R 13/713* (2006.01)
*H01H 13/02* (2006.01)
*H02H 3/02* (2006.01)

(52) U.S. Cl.
CPC .............. *H02H 5/04* (2013.01); *B60L 1/006* (2013.01); *H01H 13/023* (2013.01); *H01R 13/713* (2013.01); *H02H 3/025* (2013.01); *H02H 5/048* (2013.01)

(58) Field of Classification Search
CPC ........ H02H 5/048; H02H 11/005; H02H 9/02; H01R 13/713; B60L 1/006; H01H 13/023
See application file for complete search history.

(56) References Cited

U.S. PATENT DOCUMENTS

| | | | |
|---|---|---|---|
| 5,283,429 A * | 2/1994 | Campolo | G01K 11/32 250/227.14 |
| 5,946,180 A * | 8/1999 | Simpson | H01R 13/7039 307/126 |
| 6,552,888 B2 | 4/2003 | Weinberger | |
| 7,505,237 B2 | 3/2009 | Baxter | |
| 8,122,265 B2 | 2/2012 | Radhakrishnan et al. | |
| 8,729,856 B2 * | 5/2014 | Nathan | H01R 13/6683 320/109 |
| 9,884,562 B2 * | 2/2018 | Yamamoto | B60L 53/16 |
| 2005/0212646 A1 * | 9/2005 | Watchorn | H01H 37/74 337/16 |
| 2009/0167537 A1 * | 7/2009 | Feliss | B60L 53/16 340/584 |
| 2009/0195237 A1 * | 8/2009 | Feliss | B60L 53/68 323/318 |
| 2013/0134933 A1 * | 5/2013 | Drew | H02H 5/04 320/109 |
| 2020/0062125 A1 * | 2/2020 | Brauner | B60L 1/006 |

* cited by examiner

*Primary Examiner* — Fred E Finch, III
*Assistant Examiner* — Rafael O De Leon Domenech
(74) *Attorney, Agent, or Firm* — David B Kelley; Brooks Kushman P.C.

(57) ABSTRACT

A vehicle includes a generator, an outlet, and a controller. The generator is electrically connected to the outlet. The controller is programmed to, responsive to outlet temperature being less than a threshold, deliver an electric current from the generator to an external device that is connected to the outlet. The controller is further programmed to, responsive to the outlet temperature exceeding the threshold, inhibit delivering the current from the electric machine to the external device.

20 Claims, 4 Drawing Sheets

VEHICLE AND METHOD OF DELIVERING ELECTRICAL CURRENT TO AN OUTLET ON THE VEHICLE

TECHNICAL FIELD

The present disclosure relates to vehicles having electrical outlets that provide power to an external device when the external device is plugged into the outlet.

BACKGROUND

Electrical outlets are configured to provide power to a device when the device is plugged into the outlet.

SUMMARY

A vehicle includes an electric machine, an outlet, and a controller. The electric machine is configured to generate electrical power. The outlet is connected to the electric machine. The controller is programmed to deliver current at a magnitude from the electric machine to an external device that is connected to the outlet. The controller is further programmed to change the magnitude as temperature of the outlet changes within a predefined range.

A vehicle includes a generator, an outlet, and a controller. The generator is electrically connected to the outlet. The controller is programmed to, responsive to outlet temperature being less than a threshold, deliver an electric current from the generator to an external device that is connected to the outlet. The controller is further programmed to, responsive to the outlet temperature exceeding the threshold, inhibit delivering the current from the electric machine to the external device.

A method of controlling a vehicle includes delivering current from an electric machine to an outlet responsive to connecting a first external device to the outlet and a temperature of the outlet being less than a threshold and inhibiting delivering current from the electric machine to the outlet responsive to the temperature exceeding the threshold.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
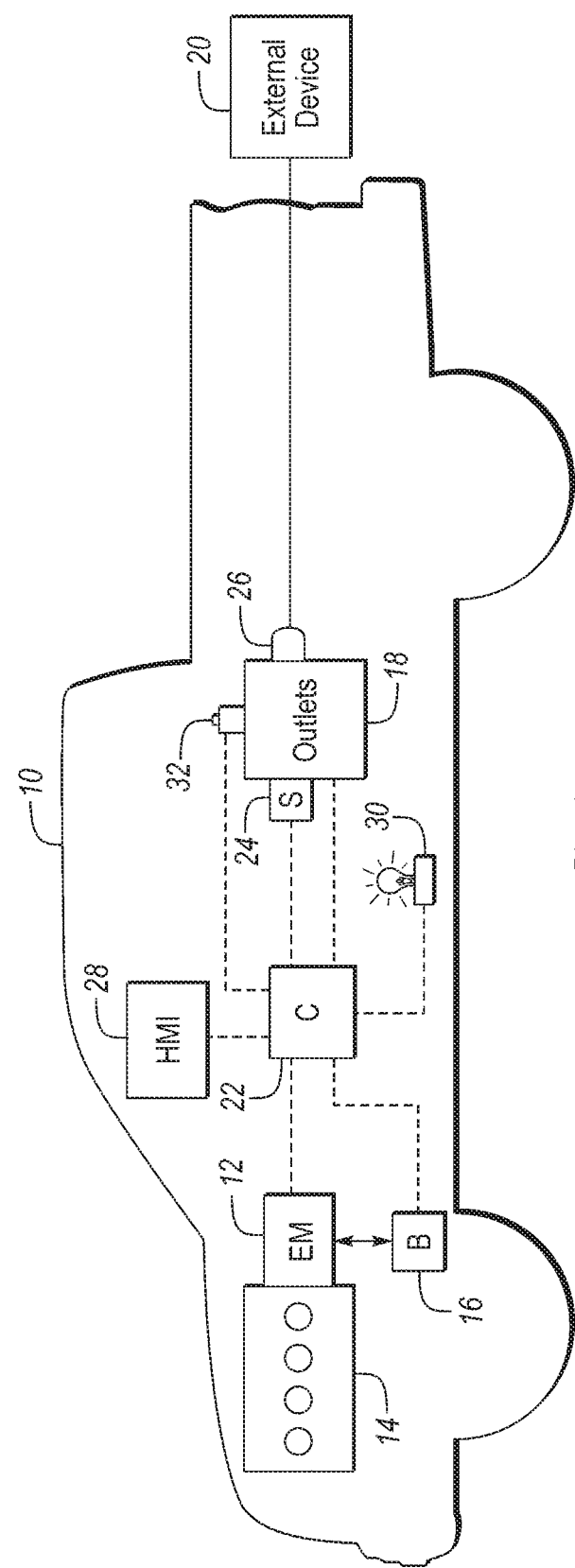
FIG. 1 is a schematic illustration of an exemplary vehicle.

Referring to FIG. 1, a schematic diagram of a vehicle 10 is illustrated. The vehicle 10 may be a conventional vehicle that is propelled by an internal combustion engine, an electric vehicle that is propelled by an electric machine such as a motor/generator, or any type of hybrid vehicle that is propelled directly or indirectly by both an internal combustion engine and an electric machine.

The vehicle 10 includes an electric machine 12 that is configured to generate electrical power. More specifically, the electric machine 12 may be a motor/generator that is configured to propel the vehicle when operating as an electric motor and to generate electric power when operating as a generator. The electric machine 12 may operate as a generator during periods of regenerative braking (where kinetic energy of the vehicle is converted into electrical energy and is stored within a battery 16) or when being powered by another source, such as an internal combustion engine 14. The electric machine 12 may also operate as a generator when being powered by the battery 16. In an alternative embodiment, the electric machine 12 may not be configured to propel the vehicle 10 and may simply be a generator that is powered by the engine 14 and/or the battery 16 in order to generate electricity. The battery 16 may be a high-voltage electric battery 16.

The vehicle 10 may include one or more electrical outlets 18. The electrical outlets 18 may be configured to provide 120 volts, 220, 230, or 240 volts to an external device 20 that is connected to one of the electrical outlets 18. The electric current provided by the outlets 18 may be single-phase or multiple-phase. The external device 20 may be any type of device that plugs into an electrical outlet to receive electrical power, such as power tools, lighting devices, air compressors, etc. The electric machine 12 and/or the battery 16 may be configured to provide electrical power to the outlets 18 and any external device 20 that is connected to one of the outlets 18. The electric machine 12 and/or the battery 16 may be connected to the electrical outlets 18 through a controller 22. The controller 22 may also be referred to as an on-board generator module or controller, which may be integral to the electric machine 12. The controller 22 may be configured to control the amount of electric current that is being delivered from the generator 12 and/or the battery 16 to the electrical outlets 18.

One or more temperature sensors 24 (e.g., thermistors, thermocouples, resistance temperature detectors, or any other type of temperature sensors) may be configured to relay the temperatures of the outlets 18 back to the controller 22. More specifically, the temperature sensors 24 may be configured to relay the temperatures of the interface between the outlets 18 and a plug 26 of the external device 20 that is connected to one of the outlets 18 (e.g., the temperature of the electrical contacts within the outlet 18 that mate with the electric contacts of the plug 26). The outlets 18 may experience excessive heating under a scenario where a bad connection is made between the interface of one of the outlets 18 and the plug 26 (e.g., under a condition where the electrical contacts within the outlet 18 and/or electrical contacts of the plug 26 are corroded). The excessive heating may result in damage (e.g., melting or burning) to the outlet 18 and/or the plug 26 of the external device 20. Therefore, it may be advantageous to either reduce the electric current being delivered to the outlet 18 or inhibit the electrical current being delivered to the outlet 18 when excessive heat within the outlet 18 is detected.

The vehicle 10 may also include a human machine interface (HMI) 28 that is in communication with the controller 22. The HMI 28 may include an interface that allows an operator to control the electrical current being delivered from the electric machine 12 and/or the battery 16 to the one or more outlets 18. For example, the interface may include control buttons that allow an operator to either turn on or turn off the electrical power being delivered from the electric machine 12 and/or the battery 16 to the one or more outlets 18. The HMI 28 may also include a display screen. The display screen may include a gauge that displays a magnitude of the electrical current that is flowing through one of the outlets 18 to power the external device 20.

In the event that the temperature reading from the sensor 24 of one of the outlets 18 exceeds a threshold value, the electrical current that is being delivered to the outlet 18 may be shut off (i.e., decreased to zero). This may involve triggering a fault within the controller 22 or tripping a relay (not shown) in order to cut the power off from the electrical outlet 18. The controller 22 may illuminate a fault indicator light 30 when the temperature reading from the sensor 24 of one of the outlets 18 exceeds a threshold value resulting in triggering a fault within the controller 22 or tripping a relay. A reset button 32 that is in communication with the controller 22 may be configured to restore delivering electrical current to the outlet 18 when activated. The reset button 32 may also turn off the fault indicator light 30 and reset the fault within the controller 22 or the relay when activated. The one or more outlets 18, the HMI 28, the fault reset light 30, and/or the reset button 32 may be disposed within a cabin of the vehicle 10, at some location on a cargo bed (e.g., on the load floor) if the vehicle 10 is a pick-up truck, or at any other location on the vehicle 10.

While illustrated as one controller, the controller 22 may be part of a larger control system and may be controlled by various other controllers throughout the vehicle 10, such as a vehicle system controller (VSC). It should therefore be understood that the controller 22 and one or more other controllers can collectively be referred to as a "controller" that controls various actuators in response to signals from various sensors to control various functions of the vehicle 10. The controller 22 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the vehicle 10.

Figure 2:
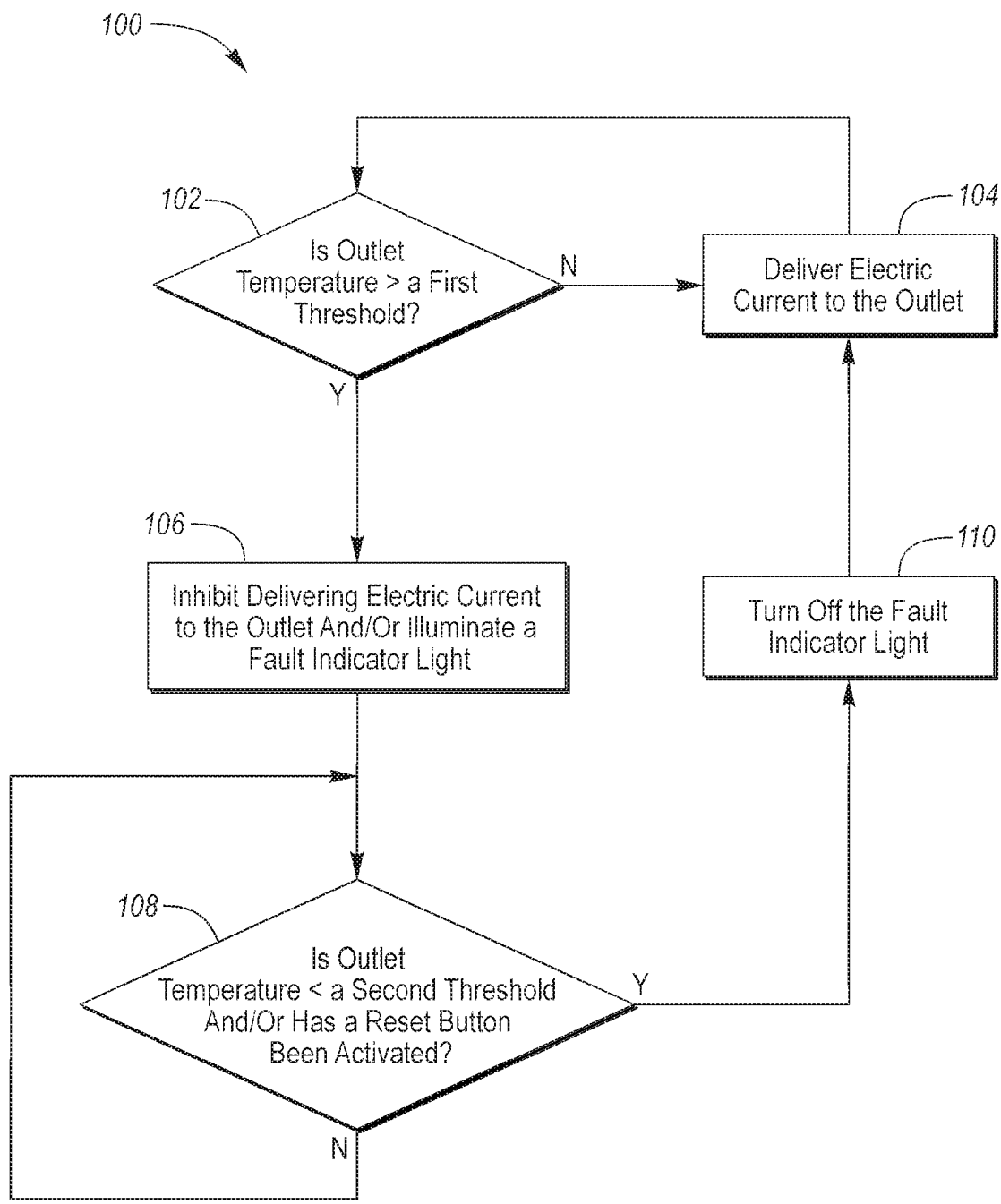
FIG. 2 is a flowchart of a first method for controlling an electrical current being delivered to an electrical outlet on the vehicle.

Referring to FIG. 2, a first method 100 for controlling the electrical current being delivered to an electrical outlet 18 on the vehicle is 10 illustrated. The method 100 may be stored as control logic and/or an algorithm within the controller 22. The controller 22 may implement the method 100 by controlling the various components of the vehicle 10, including the subcomponents depicted in FIG. 1. The method 100 is initiated at block 102, where it is determined if the temperature of the outlet 18 (e.g., the temperature of the electrical contacts within the outlet 18) is greater than a first threshold. If the temperature of the outlet 18 is not greater than the first threshold method 100 moves on to block 104 where electrical current is delivered from the electric machine 12 and/or the battery 16 to the outlet 18 (and more specifically from the electric machine 12 and/or the battery 16 to the external device 20 that is connected to the outlet 18). The method 100 then recycles back to the beginning of block 102 from block 104.

Returning to block 102, if it is determined that the temperature of the outlet 18 is greater than the first threshold the method 100 moves on to block 106 where delivering electric current from the electric machine 12 and/or the battery 16 to the outlet 18 (and more specifically from the electric machine 12 and/or the battery 16 to the external device 20 that is connected to the outlet 18) is inhibited. The fault indicator light 30 may also be illuminated at block 106.

The method 100 then moves on to block 108 where it is determined if the temperature of the outlet 18 (e.g., the temperature of the electrical contacts within the outlet 18) is less than a second threshold and/or if the reset button 32 has been activated. If the temperature of the outlet 18 is not less than the second threshold and the reset button 32 has not been activated, the method 100 recycles back to the beginning of block 108. If the temperature of the outlet 18 is less than the second threshold and/or if the reset button 32 has been activated, the method 100 moves on to block 110. It should be noted that the second threshold of block 108 may have the same value or a different value as the first threshold of block 102, and that block 108 may require only one of the conditions or may require both of the conditions (i.e., the temperature of the outlet 18 being less than the second threshold and the reset button 32 being activated) before transitioning to block 110. Furthermore, alternative embodiments of block 108 may only make one of the two determinations (i.e., determining if the temperature of the outlet 18 is less than the second threshold or determining if the reset button 32 has been activated) while omitting the second of the two determinations before moving on to the next step (i.e., recycling back through block 108 or moving on to block 110).

At block 110, the fault indicator light 30 (if previously illuminated) is turned off. After block 110, the method 100 moves on to block 104 where delivering electrical current from the electric machine 12 and/or the battery 16 to the outlet 18 is restored. More specifically, at block 104 delivering electrical current from the electric machine 12 and/or the battery 16 to the external device 20 that is connected to the outlet 18 is restored. The method 100 then recycles back to the beginning of block 102 from block 104.

It should be understood that the flowchart in FIG. 2 is for illustrative purposes only and that the method 100 should not be construed as limited to the flowchart in FIG. 2. Some of the steps of the method 100 may be rearranged while others may be omitted entirely.

Figure 3:
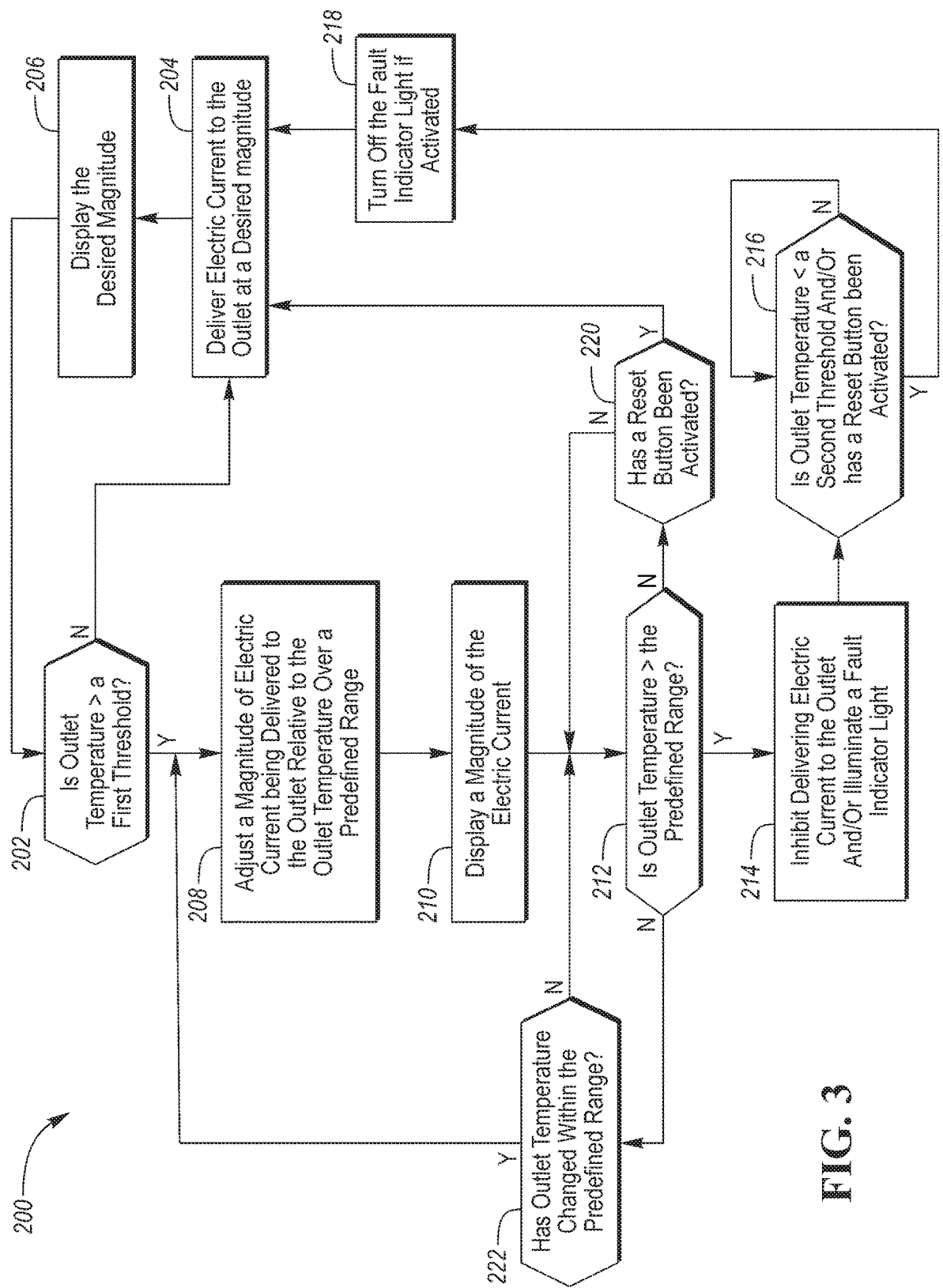
FIG. 3 is a flowchart of a second method for controlling the electrical current being delivered to the electrical outlet on the vehicle.

Referring to FIG. 3, a second method 200 for controlling the electrical current being delivered to an electrical outlet 18 on the vehicle is 10 illustrated. The method 200 may be stored as control logic and/or an algorithm within the controller 22. The controller 22 may implement the method 200 by controlling the various components of the vehicle 10, including the subcomponents depicted in FIG. 1. The method 200 is initiated at block 202, where it is determined if the temperature of the outlet 18 (e.g., the temperature of the electrical contacts within the outlet 18) is greater than a first threshold. If the temperature of the outlet 18 is not greater than the first threshold, the method 200 moves on to block 204 where electrical current is delivered at a desired magnitude from the electric machine 12 and/or the battery 16 to the outlet 18 (and more specifically from the electric machine 12 and/or the battery 16 to the external device 20 that is connected to the outlet 18).

The desired magnitude may refer to a maximum magnitude of electric current that can be delivered from the electric machine 12 and/or the battery to the external device 20 via the outlet 18 or a magnitude of electric current that is required by the external device 20. After block 204, the method 200 moves on to block 206 where the desired magnitude of the electric current being delivered from the electric machine 12 and/or the battery 16 to the outlet 18 (and more specifically from the electric machine 12 and/or the battery 16 to the external device 20 that is connected to the outlet 18) is displayed. The desired magnitude of the electric current being delivered from the electric machine 12 and/or the battery 16 to the outlet 18 may be displayed on the display screen of the HMI 28. The method 200 then recycles back to the beginning of block 202 from block 206.

Returning to block 202, if it is determined that the temperature of the outlet 18 (e.g., the temperature of the electrical contacts within the outlet 18) is greater than the first threshold, the method 200 moves on to block 208 where a magnitude of the electric current being delivered from the electric machine 12 and/or the battery 16 to the outlet 18 (and more specifically from the electric machine 12 and/or the battery 16 to the external device 20 that is connected to the outlet 18) is adjusted relative to the temperature of the outlet 18 (e.g., relative to the temperature of the electrical contacts within the outlet 18) over a predefined range. More specifically, the magnitude of the electric current being delivered from the electric machine 12 and/or the battery 16 to the outlet 18 may decrease as the temperature of the outlet 18 increases over the predefined range or may increase as the temperature of the outlet 18 decreases over the predefined range. The magnitude of the electric current at block 208 may decrease over the predefined range according to a linear function, an exponential function, a step function (i.e., where the magnitude of the electric current has changing values over the predefined range that are constant within subset ranges in the predefined range), etc. as the temperature outlet 18 increases. The method 200 then moves on to block 210 where the magnitude of the electric current determined at block 208 that is being delivered from the electric machine 12 and/or the battery 16 to the outlet 18 (and more specifically from the electric machine 12 and/or the battery 16 to the external device 20 that is connected to the outlet 18) is displayed. The magnitude of the electric current determined at block 208 that is being delivered from the electric machine 12 and/or the battery 16 to the outlet 18 may be displayed on the display screen of the HMI 28.

The method 200 next moves on to block 212 where it is determined if the temperature of the outlet 18 (e.g., the temperature of the electrical contacts within the outlet 18) is greater is greater than the predefined range referenced in block 208. If it is determined that the temperature of the of the outlet 18 is greater than the predefined range, the method 200 moves on to block 214 where delivering electric current from the electric machine 12 and/or the battery 16 to the outlet 18 (and more specifically from the electric machine 12 and/or the battery 16 to the external device 20 that is connected to the outlet 18) is inhibited. The fault indicator light 30 may also be illuminated at block 214.

The method 200 then moves on to block 216 where it is determined if the temperature of the outlet 18 (e.g., the temperature of the electrical contacts within the outlet 18) is less than a second threshold and/or if the reset button 32 has been activated. If the temperature of the outlet 18 is not less than the second threshold and the reset button 32 has not been activated, the method 200 recycles back to the beginning of block 216. If the temperature of the outlet 18 is less than the second threshold and/or if the reset button 32 has been activated, the method 200 moves on to block 218. It should be noted that the second threshold of block 216 may have the same value or a different value as the first threshold of block 202, and that block 216 may require only one of the conditions or may require both of the conditions (i.e., the temperature of the outlet 18 being less than the second threshold and the reset button 32 being activated) before transitioning to block 218. Furthermore, alternative embodiments of block 216 may only make one of the two determinations (i.e., determining if the temperature of the outlet 18 is less than the second threshold or determining if the reset button 32 has been activated) while omitting the second of the two determinations before moving on to the next step (i.e., recycling back through block 216 or moving on to block 218).

At block 218, the fault indicator light 30 (if previously illuminated) is turned off. After block 218, the method 200 moves on to block 204 where electrical current is delivered at the desired magnitude from the electric machine 12 and/or the battery 16 to the outlet 18 (and more specifically from the electric machine 12 and/or the battery 16 to the external device 20 that is connected to the outlet 18). The method 100 then recycles back to the beginning of block 202 from block 204 via block 206.

Returning to block 212, if it is determined that the temperature of the outlet 18 is not greater than the predefined range, the method 200 simultaneously moves onto blocks 220 and 222. At block 220 it is determined if the reset button 32 has been activated. If the reset button 32 has not been activated, the method 200 recycles back to the beginning of block 212. If the reset button 32 has been activated, the method 200 moves on to block 204 where delivering electrical current at the desired magnitude from the electric machine 12 and/or the battery 16 to the outlet 18 is restored (and more specifically from the electric machine 12 and/or the battery 16 to the external device 20 that is connected to the outlet 18). The method 200 then recycles back to the beginning of block 202 from block 204 via block 206.

At block 222, it is determined if the temperature of the outlet 18 (e.g., the temperature of the electrical contacts within the outlet 18) has changed within the predefined range. If the temperature of the outlet 18 has not changed within the predefined range, the method 200 recycles back to the beginning of block 212. If the temperature of the outlet 18 has changed within the predefined range, the method 200 recycles back to the beginning of block 208 where the magnitude of the electric current being delivered from the electric machine 12 and/or the battery 16 to the outlet 18 (and more specifically from the electric machine 12 and/or the battery 16 to the external device 20 that is connected to the outlet 18) is readjusted relative to the temperature of the outlet 18 (e.g., relative to the temperature of the electrical contacts within the outlet 18) over the predefined range.

It should be understood that the flowchart in FIG. 3 is for illustrative purposes only and that the method 200 should not be construed as limited to the flowchart in FIG. 3. Some of the steps of the method 200 may be rearranged while others may be omitted entirely.

Referring to FIGS. 4A-4D, various configurations of the one or more outlets 18 are illustrated. The outlets 18 include three orifices 34 and a face plate 36. Within the three orifices 34 are the electrical contacts that are configured to mate with electrical contacts of the plug 26 of the external device 20. A first contact within a first of the three orifices 34 may be connected to a "hot" wire, a second contact within a second of the three orifices 34 may be connected to a "neutral" wire, and a third contact within a third of the three orifices 34 may be connected to a "ground" wire. The face plate 36 may be made from a non-conducting material, such as a polymer or plastic. The polymer or plastic may comprise a luminescent material that is easily visible under low ambient light conditions. The entire face plate 36 may be made from the luminescent material or only a portion of the face plate 36 may be made from the luminescent material. For Example, an outer perimeter of the face plate 36 may be made from the luminescent material while the remainder of the face plate 36 is not. The temperature sensor 24 may be disposed behind the face plate 36. The temperature sensor 24 may also be disposed between the three electrical contacts of the outlet 18 that are within the three orifices 34.

Figure 4A:
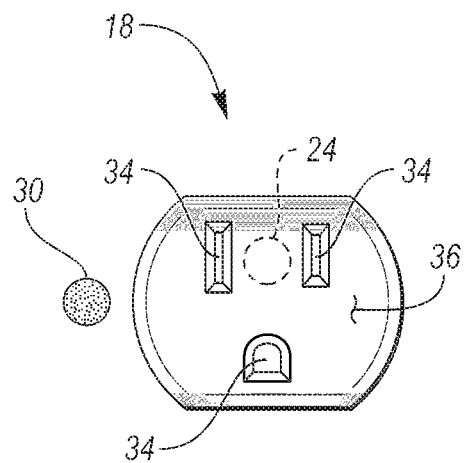
FIGS. 4A-4D are various configurations of the electrical outlet.
Figure 4C:
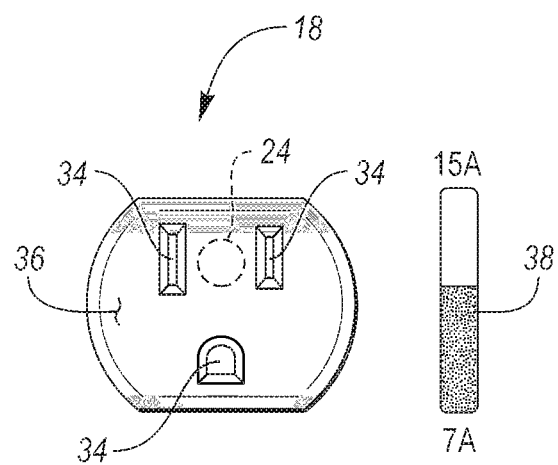
Figure 4B:
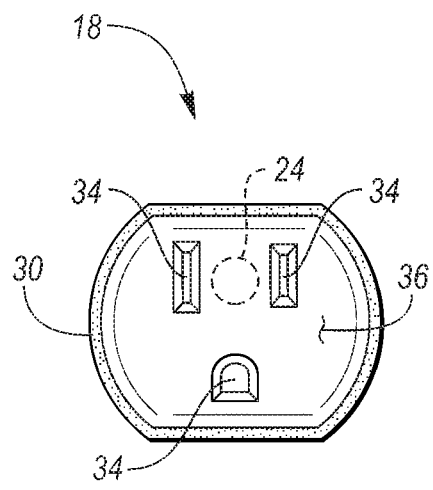

In the first configuration of the outlet 18 depicted in FIG. 4A and in the second configuration of the outlet 18 depicted in FIG. 4B, the fault indicator light 30 is disposed adjacent to the outlet 18. In FIG. 4A, the fault indicator light 30 is depicted as single light source that is adjacent to the outlet 18. In FIG. 4B, the fault indicator light 30 is depicted as ring of light that is disposed around the face plate 36 of the outlet 18. The fault indicator light 30 may be any type of light source, such as a light emitting diode (LED) or an incandescent light bulb. In embodiments that include more than one outlet 18, each outlet 18 may include a separate fault indicator light 30.

In the third configuration of the outlet 18 depicted in FIG. 4C, a display 38 is disposed adjacent to the outlet 38. The display 38 may specifically be a gauge that displays the magnitude of the electrical current that is flowing from the electric machine 12 and/or the battery 16, through one of the outlets 18, and to the external device 20. The display 38 may specifically display the amperage of the current that is flowing from the electric machine 12 and/or the battery 16, through one of the outlets 18, and to the external device 20.

Figure 4D:
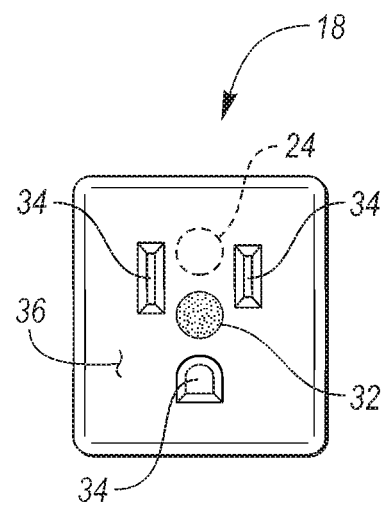

In a fourth configuration of the outlet 18 depicted in FIG. 4D, the reset button 32 may project from the face plate 36 of the outlet 18. In such a configuration, the reset button 32 may be deactivated by disconnecting the plug 26 of the external device 20 from the outlet 18 followed by reconnecting the plug 26 of the external device to the outlet 18 or connecting a second plug of a second external device to the outlet 18. Based on this positioning of the reset button 32 either method 100 or 200 described above, may be adjusted to include disconnecting the plug 26 of the external device 20 from the outlet 18, following by reconnecting the plug 26 of the external device to the outlet 18 or connecting a second plug of a second external device to the outlet 18, which activates the reset button 32. Such activation of the reset button 32 in turn either restores delivering electrical current from the electric machine 12 and/or the battery 16 to the external device 20 that has been reconnected to the outlet 18 or results in delivering current from the electric machine 12 and/or the battery 16 to the second external device that has been connected to the outlet 18.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
   an electric generator configured to generate electrical power;
   an outlet connected to the electric generator; and
   a controller programmed to,
      in response to a temperature of the outlet being less than a first temperature threshold, deliver current at a first magnitude from the electric generator to an external device that is connected to the outlet,
      in response to an increase in the temperature of the outlet to a first temperature value that is within a predefined range that is greater than the first temperature threshold but less than a second temperature threshold, decrease the current being delivered from the electrical generator to the external device to a second magnitude that is less than the first magnitude,
      in response to a decrease in the temperature of the outlet to a second temperature value that is within the predefined range, increase the current being delivered from the electrical generator to the external device to a third magnitude that is less than the first magnitude, and
      in response to a temperature of the outlet being greater than the second temperature threshold, inhibit delivering current from the electric generator to the external device.

2. The vehicle of claim 1 further comprising a reset button disposed on the outlet, and wherein the controller is further programmed to, responsive to activation of the reset button after inhibiting delivering the current from the electric generator to the external device, restore delivering current from the electric generator to the external device.

3. The vehicle of claim 1 further comprising a fault indicator light, and wherein the controller is further programmed to, responsive to the temperature of the outlet exceeding the predefined range, illuminate the fault indicator light.

4. The vehicle of claim 1 further comprising a display unit configured to exhibit the magnitude of the current.

5. The vehicle of claim 1, wherein the controller is programmed to,
   in response to decreases in the temperature of the outlet to values within the predefined range, decrease the electrical current being delivered from the electrical generator to the external device according to a linear function, and
   in response to increases in the temperature of the outlet to values within the predefined range, increase the electrical current being delivered from the electrical generator the external device according to the linear function.

6. The vehicle of claim 1, wherein the controller is programmed to,
in response to decreases in the temperature of the outlet to values within the predefined range, decrease the electrical current being delivered from the electrical generator to the external device according to an exponential function, and
in response to increases in the temperature of the outlet to values within the predefined range, increase the electrical current being delivered from the electrical generator the external device according to the exponential function.

7. The vehicle of claim 1, wherein the controller is programmed to,
in response to decreases in the temperature of the outlet to values within the predefined range, decrease the electrical current being delivered from the electrical generator to the external device according to a step function, and
in response to increases in the temperature of the outlet to values within the predefined range, increase the electrical current being delivered from the electrical generator the external device according to the step function.

8. A vehicle comprising:
a generator electrically connected to an outlet; and
a controller programmed to,
responsive to outlet temperature being less than a first temperature threshold, deliver an electric current having a first magnitude from the generator to an external device that is connected to the outlet,
responsive to an increase in the outlet temperature to a first temperature value that is within a predefined range that is greater than the first temperature threshold but less than a second temperature threshold, decrease the current being delivered from the generator to the external device to a second magnitude that is less than the first magnitude,
responsive to a decrease in the outlet temperature to a second temperature value that is within the predefined range, increase the current being delivered from the generator to the external device to a third magnitude that is less than the first magnitude, and
responsive to the outlet temperature exceeding the second threshold, inhibit delivering the current from the generator to the external device.

9. The vehicle of claim 8 further comprising a reset button disposed on the outlet, and wherein the controller is further programmed to, responsive to activation of the reset button after inhibiting delivering the current from the generator to the external device, restore delivering current from the generator to the external device.

10. The vehicle of claim 8, wherein the controller is programmed to,
in response to decreases in the temperature of the outlet to values within the predefined range, decrease the electrical current being delivered from the generator to the external device according to a linear function, and
in response to increases in the temperature of the outlet to values within the predefined range, increase the electrical current being delivered from the generator the external device according to the linear function.

11. The vehicle of claim 8, wherein the controller is programmed to,
in response to decreases in the temperature of the outlet to values within the predefined range, decrease the electrical current being delivered from the generator to the external device according to an exponential function, and
in response to increases in the temperature of the outlet to values within the predefined range, increase the electrical current being delivered from the generator the external device according to the exponential function.

12. The vehicle of claim 8, wherein the controller is programmed to,
in response to decreases in the temperature of the outlet to values within the predefined range, decrease the electrical current being delivered from the generator to the external device according to a step function, and
in response to increases in the temperature of the outlet to values within the predefined range, increase the electrical current being delivered from the generator the external device according to the step function.

13. A method of controlling a vehicle comprising:
delivering current at a first magnitude from an electric generator to an outlet responsive to connecting a first external device to the outlet and a temperature of the outlet being less than a first threshold;
decreasing the current being delivered from the electric generator to the outlet to a second magnitude that is less than the first magnitude responsive to an increase in the temperature of the outlet to a first value that is within a predefined range that is greater than the first threshold but less than a second threshold;
increasing the current being delivered from the electric generator to the outlet to a third magnitude that is less than the first magnitude responsive to a decrease in the temperature of the outlet to a second value that is within the predefined range; and
inhibiting delivering current from the electric generator to the outlet responsive to the temperature exceeding the second threshold.

14. The method of claim 13 further comprising:
illuminating a fault indicator light responsive to the temperature exceeding the second threshold.

15. The method of claim 13 further comprising:
turning off the fault indicator light responsive to activation of a reset button.

16. The method of claim 13 further comprising:
disconnecting the first external device from the outlet, and connecting a second external device to the outlet.

17. The method of claim 16 further comprising:
delivering current from the electric generator to the second external device responsive to activation of a reset button.

18. The method of claim 13, wherein the current is decreased to the second magnitude and increased to the third magnitude according to a linear function.

19. The method of claim 13, wherein the current is decreased to the second magnitude and increased to the third magnitude according to an exponential function.

20. The method of claim 13, wherein the current is decreased to the second magnitude and increased to the third magnitude according to a step function.

* * * * *